UNITED STATES PATENT OFFICE.

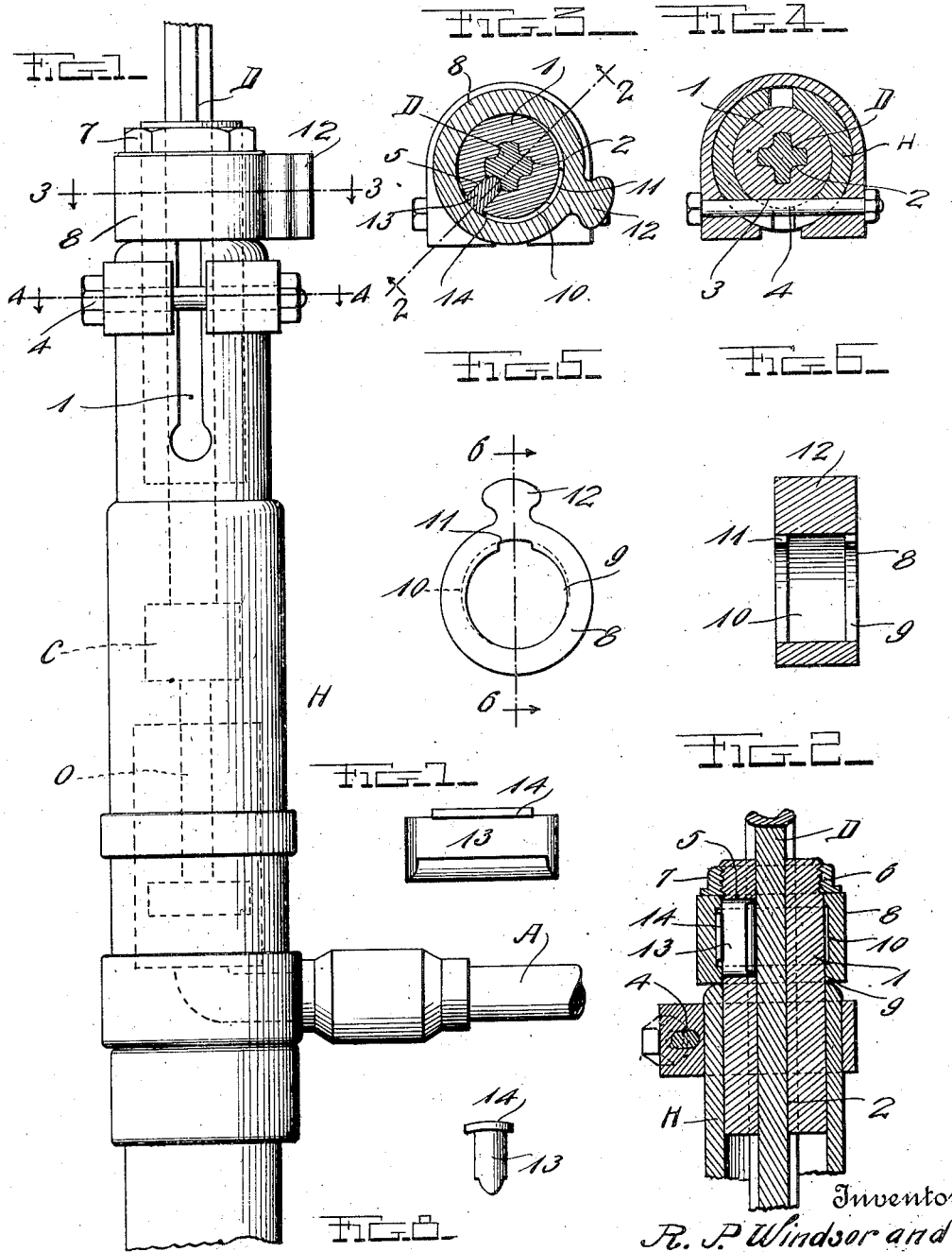

RUFUS P. WINDSOR, OF ELKTON, AND CHARLES H. BOEHLER, OF CRIPPLE CREEK, COLORADO.

CHUCK FOR ROCK-DRILLING MACHINES.

1,057,605.  Specification of Letters Patent.  Patented Apr. 1, 1913.

Application filed November 23, 1911. Serial No. 662,073.

*To all whom it may concern:*

Be it known that we, RUFUS P. WINDSOR, a citizen of the United States, residing at Elkton, county of Teller, State of Colorado, and CHARLES H. BOEHLER, a citizen of the United States, residing at Cripple Creek, in the county of Teller and State of Colorado, have invented certain new and useful Improvements in Chucks for Rock-Drilling Machines; and we do declare the following to be a full, clear, and exact description of the invention, such as will enable others skilled in the art to which it appertains to make and use the same.

This invention relates to stone working, and more especially to drilling machines; and the object of the same is to provide a locking device operating somewhat on the principle of a chuck whereby the drill can be instantly locked in the barrel of the machine by the operator at will, as when the drill is stuck in the rock and he desires to extract it by pulling or jerking suddenly on the handle.

The broad object of the invention is accomplished by providing the barrel of the machine with a manually-operated lock or chuck mechanism which stands for most of the time out of engagement with the drill or its driving mechanism or the chuck which connects the two, but which lock the operator can easily throw into engagement with one of these parts as soon as he has cut off the power.

It is well known by those who use machines of this character that, whether the drill reciprocates or rotates, it does sometimes become stuck in the rock. Heretofore it was necessary to uncouple it from its driving mechanism, which was usually some form of chuck, remove said mechanism whether it be a hand brace or a machine perhaps operated by compressed air brought from a remote point, apply a tool to the butt end of the drill where it protruded from the rock, and pull it forcibly outward. Much time is lost in this operation whose main purpose is to get something attached to the butt end of the drill by which it can be yanked out of place, because the ordinary chuck usually connecting the drill with the driving mechanism or stock is such that a quick pull to the rear would dislodge it.

By the present invention the drill may be permitted to remain within its chuck and within the barrel of a power-operated machine, but our improved lock (which operates much on the principle of a chuck but which we had perhaps better give some other name to avoid confusion) permits the operator to instantly and very firmly connect the drill with the barrel of the machine in which it is working, so that this barrel itself takes the place of the tool above referred to and can be forcibly pulled on to withdraw the drill from the rock.

One embodiment of our idea is set forth in the following specification and claims, and shown in the drawings wherein—

Figure 1 is a side elevation of the barrel end of an ordinary rock drill, with these improvements attached; Fig. 2 is a central longitudinal sectional view, taken about on the line 2—2 of Fig. 3, and the latter view is a cross section on the line 3—3 of Fig. 1; Fig. 4 is a cross section on the line 4—4 of Fig. 1; Fig. 5 is a plan view of the collar, and Fig. 6 is a sectional view thereof on the line 6—6 of Fig. 5; Fig. 7 is an enlarged side elevation of the locking gib, and Fig. 8 is an end elevation thereof.

The drawings illustrate in outline or in dotted lines a drill D connected by a chuck C with operating mechanism O located within a handle H of an air-driven reciprocating portable drilling machine, and the letter A designates the pipe line which brings the air to the piston of the operating mechanism in a manner well known and which will need no further description. The shape and size of the drill and the nature of the chuck connecting it with the operating mechanism form no part of this idea, and it is quite possible that no parts of this device need be modified for the purpose of employing our improved lock, save the handle or barrel H.

Coming now more particularly to the details of the invention, the numeral 1 designates a sleeve mounted within the barrel or handle H, its bore 2 being shaped to permit the longitudinal reciprocation of the drill D when the latter is connected to and driven by the operating mechanism O in a manner well known. This sleeve projects beyond the outer end of the barrel, and its inner portion has a transverse groove 3 in which lies a bolt 4 extending through the barrel and holding these two parts together. The projecting portion of the sleeve has a longitudinal slot 5 through one wall for a purpose to appear below, and its outer extremity is threaded as at 6 for the reception of a nut 7. Surrounding the projecting portion of said sleeve 1 and its slot 5 below the nut 7 is a collar 8 whose bore 9 is made cylindrical at its extremities so as to fit the sleeve loosely, has a slightly eccentric path 10 between its extremities for a purpose to appear below, and has an upright notch 11 at the deepest part of the eccentric portion of the bore; and on the outer side of this sleeve opposite said notch is formed a lug 12.

The numeral 13 designates a gib or key whose inner edge is shaped to fit the drill D, whose body is of a size to fit loosely within the slot 5, and whose outer edge carries a slightly projecting shoulder 14 wider than said slot 5 but slightly narrower than the width of the notch 11. In height this shoulder is considerably less than that of the longitudinal slot 5 and somewhat less than the width of the path 10.

The parts that have been described are of the proper size and proportion to fit the machine to which the device is attached and the drill carried thereby, and as above suggested this specification and drawing are but illustrative of one embodiment of our invention and therefore changes in details may be made without departing from its principle.

In use the parts are set up by attaching the sleeve to the drilling machine handle, as by the bolt 4 or otherwise, inserting the gib 13 in the slot 5 with its active edge presented inward toward the drill D and its flange 14 resting against the outer face of the sleeve around its slot 5 to prevent the gib from falling into the tubular bore of the sleeve when the drill is removed, the collar 8 is then passed over the sleeve and its notch 11 slides over the outer end of the gib, and finally the nut 7 is applied and screwed down until the collar is swivelly mounted on the sleeve at such point that the outer end of the gib is opposite the eccentric path 10 in its bore. The operator then uses the drilling machine as heretofore, and this action needs no description in the present specification. If now the drill becomes stuck in the rock, he cuts off his source of power whether it be air or otherwise, rotates the collar 8 slightly as by pounding on its lug 12, thereby moving the eccentric path 10 behind the outer end of the gib 13 and pressing the inner edge of the latter inward against the drill D, and by this means the drill may be instantly locked within the barrel H without removing the drill from the chuck or disconnecting any parts of the machine. Then using the barrel as an extracting tool, the operator is able to withdraw the drill from the hole in which it is stuck, after which a movement of the lug 12 in the opposite direction instantly releases this lock, and he is ready to resume operations by turning on his motive power and placing the drill in position to do its work. Thus it will be seen that, whereas this device is of itself in the nature of a chuck because it locks a drill within a tubular member, its use is more in the nature of a lock to prevent the working movements of the drill than in the nature of a chuck to connect the drill with its driving mechanism. We have said that the inner end of the gib 12 is shaped to adapt it to the ordinary drill, but it is clear that it could be shaped to adapt it to drills of any kind or in fact to the chuck which connects the drill with the operating mechanism O; however, we prefer to apply this lock directly to the drill, because otherwise a sharp rearward movement of the barrel might dislodge the drill from its own chuck and leave the latter rigidly connected by this invention with the barrel mechanism and the drill still sticking in the hole.

We have described this device as applied to a reciprocating drill, but it is obvious that it could be applied with equal usefulness to a rotary drill or others.

What is claimed as new is:

1. The combination with the barrel containing the operating mechanism, a bolt extending across the barrel, and a drill in the latter moved by said mechanism; of a sleeve removably mounted within the end of the barrel and having a groove through which said bolt passes and a longitudinal slot in that portion of its body which projects beyond the barrel, a gib loosely mounted in said slot and having its inner edge shaped to engage the drill and its outer edge shaped to prevent its falling into the sleeve when the drill is removed, a rotary element swivelly mounted around the projecting portion of the sleeve for moving said gib inward when said element is turned, and means for holding this element removably on the projecting portion of the sleeve.

2. In a locking device for rock drills, the combination with the barrel containing the operating mechanism, and the drill moving in said barrel; of a lock carried by the barrel and adapted to be manually thrown into engagement with the drill when the driving mechanism for the latter is thrown out of action, said lock comprising a sleeve carried by the handle and having a slot through its wall, a gib loosely mounted in said slot and having its inner edge shaped to engage the drill and its outer edge carrying a shoulder, and a collar swivelly mounted around the sleeve and having an eccentric path within its bore disposed outside said shoulder and an upright notch intersecting the deepest portion of said path.

In testimony whereof we have hereunto set our hands in presence of two subscribing witnesses.

RUFUS P. WINDSOR.
CHARLES H. BOEHLER.

Witnesses:
E. F. MAY,
V. H. MANN.